United States Patent [19]

Ishiguro et al.

[11] Patent Number: 5,003,409
[45] Date of Patent: Mar. 26, 1991

[54] DUAL LAYERED MAGNETIC DATA CARD WITH READING AND RECORDING APPARATUS

[75] Inventors: Ginya Ishiguro; Norio Yano; Hirokazu Uekusa, all of Yokosuka, Japan

[73] Assignee: Nippon Telegraph and Telephone Corporation, Tokyo, Japan

[21] Appl. No.: 193,928

[22] Filed: May 13, 1988

[30] Foreign Application Priority Data

May 14, 1987 [JP] Japan .................................. 62-117515
Jan. 22, 1988 [JP] Japan .................................. 63-12083

[51] Int. Cl.$^5$ ......................... G11B 5/02; G11B 25/04
[52] U.S. Cl. ......................................... 360/59; 360/2
[58] Field of Search ............... 360/59, 2, 131; 369/13; 235/449, 493

[56] References Cited

U.S. PATENT DOCUMENTS

| | | | |
|---|---|---|---|
| 4,090,662 | 5/1978 | Fayling | 235/493 |
| 4,194,110 | 3/1980 | Lazzari et al. | 235/493 |
| 4,423,453 | 12/1983 | Kawahara et al. | 360/131 |
| 4,520,409 | 5/1985 | Kimoto et al. | 360/59 |
| 4,612,587 | 9/1986 | Kaneko et al. | 369/13 |
| 4,771,347 | 9/1988 | Horimai et al. | 360/59 |
| 4,799,114 | 1/1989 | Tsunashima | 360/59 |

FOREIGN PATENT DOCUMENTS

55-146609 11/1980 Japan .
57-20903 2/1982 Japan .
61-250022 12/1986 Japan .

OTHER PUBLICATIONS

Tsunashima et al., *IEEE Transactions on Magnetics*, vol. MAG-17, No. 6, Nov. 1981, "Thermomagnetic Writing on Exchange-Coupled Amorphous Rare-Earth Iron Double-Layer Films", pg. 2840.

May, G. H., *IBM TDB*, vol. 16, No. 7, Dec. 1973, "Beam Addressable High-Density Magnetic Record File", pg. 2365.

*Primary Examiner*—Vincent P. Canney
*Attorney, Agent, or Firm*—Joseph S. Iandiorio

[57] ABSTRACT

A dual layered magnetic card with an apparatus for reading data therefrom and recording data thereon. The magnetic card includes (a) a card body, (b) a first magnetic layer disposed on the card body, the first magnetic layer including a first magnetic material, (c) a second magnetic layer disposed on the first magnetic layer, the second magnetic layer including a second magnetic material having Curie temperature lower than that of the first magnetic material and a coercive force at an ambient temperature higher than that of the first magnetic material. Also disclosed is an apparatus for reading data on the magnetic card, having a reader, post processor and data eraser, and an apparatus for reading and recording data having a recorder, reader, post processor and a data eraser.

11 Claims, 4 Drawing Sheets

DUAL LAYERED MAGNETIC DATA CARD WITH READING AND RECORDING APPARATUS

BACKGROUND OF THE INVENTION

The present invention relates to a magnetic card and apparatus for reading data from the magnetic card, apparatus for recording data on the magnetic card and apparatus for both.

Magnetic cards are becoming common as credit cards, pre-paid cards etc. because of their cost efficiency and their compactness compared to the amount of data they can bear. Conventional magnetic cards comprise a card body usually made of plastics, a magnetic layer laid on the plastic card body and a protection layer laid on the magnetic layer for a physical protection thereof. Because data recorded on this kind of conventional magnetic cards can be read by using conventional magnetic card readers and recorders, they are open to surreptitious reading, recording and modification.

One solution for laying ban on the above-mentioned surreptitious access to the card is to form a plurality of magnetic layers on a card body, one layer overlaid by the other, and to protect the data by making it a rule to follow a prescribed procedure when accessing to the data. An example of this type of data protection is disclosed by Japanese Patent Application No. 40-23745 (D1) which is briefly described as follows.

According to D1, a first magnetic layer comprising a first magnetic material is formed on the card body and a second magnetic layer comprising a second magnetic material is formed on the first layer wherein coercive force of the first magnetic material is higher than that of the second magnetic material. When recording data on the card, magnetic field enough extensive to record data on the first magnetic layer is applied. Consequently, the data is recorded also on the second magnetic layer. In order to protect the data from surreptitious reading, a random magnetic field is applied to magnetize the second magnetic layer. Intensity of the random magnetic field is so determined as to prevent magnetization of the first magnetic layer. As a result, meaningful data is contained only in the first magnetic layer while the second magnetic layer contains random data. Therefore, by an ordinary reading means wherein a reading head comes in contact with the second magnetic layer from outside, the random data recorded on the second magnetic layer is read, consequently protecting the meaningful data written in the first magnetic layer from being read surreptitiously. In order to read the meaningful data, the second magnetic layer is first erased by applying a DC magnetic field. Then, the meaningful data in the first magnetic layer becomes accessible through the second magnetic layer.

A problem as to the above-mentioned magnetic card is that the second magnetic layer, even though the random data is erased, develops a spacing loss decreasing resolution of data recorded on the first magnetic layer and causing errors in reading them.

Another problem resides in that a relatively intensive magnetic field have to be applied to the first magnetic layer when recording data thereon, because it has high coercive force, resulting inevitably in an increase of cost for apparatus for reading and recording data on the magnetic card.

SUMMARY OF THE INVENTION

In view of the above-mentioned problems and inconveniences residing in conventional magnetic cards, the present invention is directed to provide a magnetic card which secures a high resolution and reliability in reading and recording data while protecting the data from surreptitious readings. A magnetic card according to the present invention further provides a high resistance of data against magnetic disturbances to which the card may be exposed. Still further, the magnetic card according to the present invention requires only a non-intensive magnetic field for recording data thereon.

Further, there is provided apparatus for reading and recording data on the magnetic card which apparatus provides protection of data, correctness in reading and recording data, and cost efficiency.

In a primary aspect of the invention, the magnetic card according to the present invention comprises (a) a card body; (b) a first magnetic layer laid on the card body, the first magnetic layer comprising a first magnetic material; (c) a second magnetic layer laid on the first magnetic layer, the second magnetic layer comprising a second magnetic material having a Curie temperature lower than that of the first magnetic material and a coercive force at an atmospheric temperature higher than that of the first magnetic material.

In a second aspect of the invention, there is provided a magnetic card recorder for recording data on the above-mentioned magnetic cards which recorder comprises (a) recording means for recording data on the first magnetic layer; and (b) heating means for heating the second magnetic layer to a temperature higher than the Curie temperature of the second magnetic material and lower than that of the first magnetic material.

In a third aspect of the invention, there is provided a magnetic card reader for reading data from the above-mentioned magnetic cards, which reader comprises (a) magnetic field generating means for generating magnetic field for erasing data on the first magnetic layer and (b) reading means for reading data from the second magnetic layer.

In a fourth aspect of the invention, there is provided a post-processor for post-processing the above-mentioned magnetic cards, the post-processor comprising (a) magnetic means for applying an alternating magnetic field of decreasing amplitude to the first magnetic layer to transfer a magnetization of the second magnetic layer to the first magnetic layer.

In a fifth aspect of the invention, there is provided a data eraser for erasing data transferred on the above-mentioned magnetic cards, the data eraser comprising (a) magnetic field generating means for generating magnetic field to erase data on the first magnetic layer and (b) heating means for heating the second magnetic layer to a temperature higher than the Curie temperature of the second magnetic material.

In a sixth aspect of the invention, there is provided an apparatus for reading data from the above-mentioned magnetic cards which comprises the magnetic card reader and the post-processor.

In a seventh aspect of the invention, there is provided an apparatus for reading and recording data on the above-mentioned magnetic cards which comprises a magnetic card recorder, a magnetic card reader and a post processor.

When recording data on the magnetic card, the data is recorded on the first magnetic layer by a magnetic field which is enough intensive to record data thereon but insufficient to record data on the second magnetic layer. Next, the second magnetic layer is heated to a temperature higher than the Curie temperature of the second magnetic material. By the heating, coercive force and, therefore, magnetization of the second magnetic material is lost. Then the second magnetic layer is cooled gradually during which a magnetization of the first magnetic layer transferred and fixed on the second magnetic layer by virtue of a so called thermal magnetic transfer. As a result of the thermal magnetic transfer, magnetization of the first magnetic layer and that of the second magnetic layer form a closed magnetic flux therebetween. Because the closed magnetic flux does not flow outside, magnetization can not be sensed from outside. Therefore, it is impossible to read data stored on the magnetic card by an ordinary means.

When reading data from the magnetic card, a magnetic field is applied to erase only the data recorded on the first magnetic layer. The erasure is performed by applying a magnetic field on the magnetic layers wherein intensity of the magnetic field is so determined as to affect the first magnetic layer which has a lower coercive force. Then it becomes possible to read data from the second magnetic layer.

Further objects, constructions and effects of the present invention will become clearer hereinafter.

DETAILED DESCRIPTION OF THE PREFERRED EMBODIMENTS OF THE INVENTION

Figure 1:
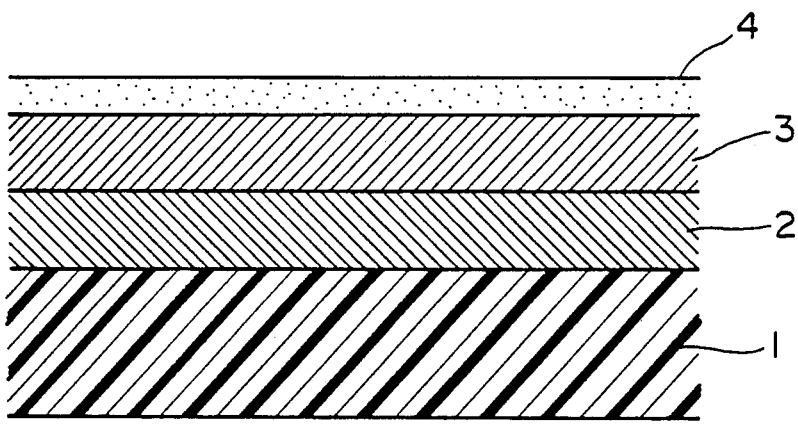
FIG. 1 is a cross-sectional view of a magnetic card according to an embodiment of the present invention.

FIG. 1 shows a preferred embodiment of magnetic card according to the present invention. As shown in the figure, a first magnetic layer 2 comprising a first magnetic material $\gamma$-$Fe_2O_3$ is laid on a card body 1 made of plastics for example. The first magnetic layer 2 is formed by spreading a dispersion, containing the first magnetic material as dispersoid, on the card body 1 and vaporing off the dispersion medium. The second magnetic layer 3, comprising a second magnetic material of powdery MnBi alloy, is laid on the first magnetic layer according to the same method as mentioned above. On top of the second magnetic layer is laid a protection layer 4 of a synthetic resin for protecting the magnetic layers from being scratched during contact and friction with a magnetic head and increasing its service period. According to the above-mentioned construction, the first magnetic layer 2 has a coercive force around 380 Oe and a Curie temperature of around 700° C. The second magnetic layer 3 has a coercive force around 12000 Oe and a Curie temperature of around 350° C.

Figure 2:
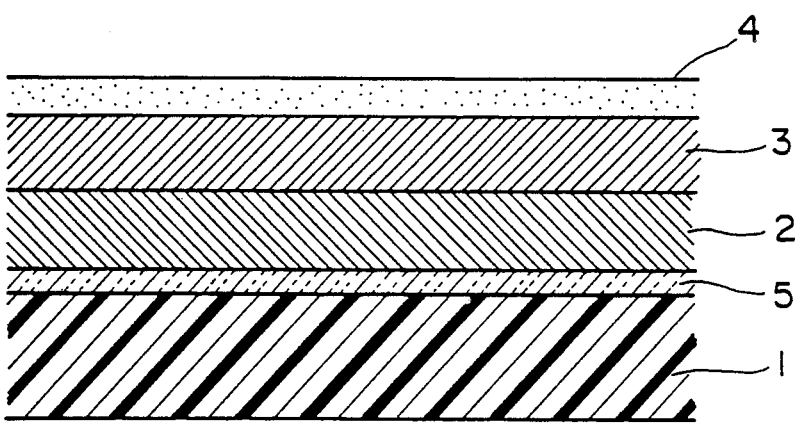
FIG. 2 is a cross-sectional view of a magnetic card according to a modified embodiment of the present invention.

FIG. 2 shows a modified embodiment of a magnetic card according to the present invention. As shown in the figure, a thermal insulation layer 5 is installed between the card body 1 and the first magnetic layer 2. When the second magnetic layer 3 is subjected to heating as will be explained later, the thermal insulation layer 5 prevents the card body from being heated. The insulation layer 5 has an effect of decreasing energy for heating up the second magnetic layer. The layer 5 also protects neighboring area from being unnecessarily heated up when a specific area on the second magnetic layer 3 is to be heated. Effect of the thermal insulation layer 5 is distinct when the card body 5 is made of a material having high thermal conductivity such as metals.

Figure 3:
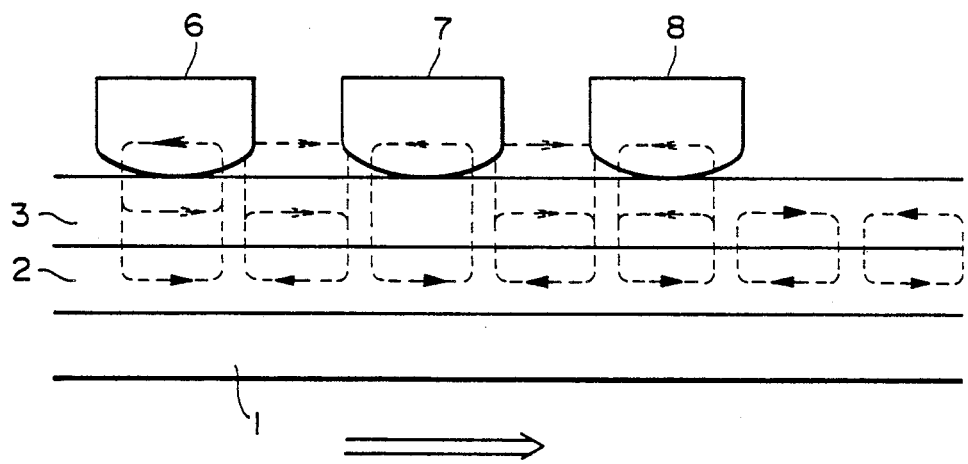
FIG. 3 is a sketch showing schematically a magnetic card recorder according to an embodiment of the present invention.

FIG. 3 shows schematically a magnetic card recorder for recording data on the magnetic cards. The apparatus comprises a recording head 6 for recording data on the card, a reading head 7 for reading data from the card, and a thermal head 8 for heating the second magnetic layer 3. Solid arrows designate directions of magnetization and dotted arrows designate directions of magnetic flux. The apparatus comprises a means (not shown) for transporting the magnetic card relative to the above-mentioned heads. Whether the magnetic card or the heads is moved relative to the other by means of the transporting means. For a simplicity of explanation, it is supposed in the following explanation that the card is transported from left to right as shown by a thick arrow in the figure.

Procedure for recording data on the magnetic cards by means of the recorder is explained as follows.

First, the magnetic card comes in contact with the recording head 6 which is generating magnetic field enough intensive for recording data on the first magnetic layer 2 but insufficient for recording data on the second magnetic layer 3. It becomes possible by selecting an appropriate intensity of magnetic field because the first magnetic material has a lower coercive force than that of the second magnetic layer. Therefore, after passing by the recording head 6, data are recorded only in the first magnetic layer 2.

Second, the magnetic card comes in contact with the reading head 7. By virtue of the reading head 7, data recorded on the first magnetic layer 2 is read out for confirmation. Because the reading head 7 contacts with the second magnetic layer and not with the first magnetic layer 2, resolution of data reading may not be very high due to a spacing loss caused by the second magnetic layer 3 coming therebetween. But a moderate resolution may be admissible for confirmation purposes as in this case. Further, in a modified embodiment, the reading head 7 may be eliminated from the recorder without sacrificing the function of recording data on the card.

Third, the magnetic card comes to the thermal head 8 which raises the temperature of the second magnetic layer 3 to a temperature equal to or higher than the Curie temperature of the second magnetic material which is around 350° C. At the Curie temperature, the second magnetic material looses the coercive force. As the magnetic card proceeds, the temperature of the second magnetic layer 3 once heated by the thermal head 8 decreases gradually. Because the second magnetic material recovers its coercive force as the temperature thereof decreases under an effect of magnetic field generated by the first magnetic layer, a magnetization which is opposite in direction to that of the first magnetic layer is transferred and fixed on the second magnetic layer by virtue of thermal magnetic transfer. Magnetic flux forms a closed loop between the first magnetic layer 2 and the second magnetic layer 3 without influencing the space outside the layers. Therefore, it becomes impossible to read the data by means of an ordinary reading head.

Incidentally, because the Curie temperature of the first magnetic material is substantially higher than that of the second magnetic material, data recorded on the first magnetic layer is not erased by the heating of the second magnetic layer. Once the data is fixed on the second magnetic layer which has a high coercive force, the data is not erased easily even when a magnetic force is applied to the card inadvertently. Thus, the data stored on the card is not only protected from unauthorized reading but also protected against inadvertent erasing.

The reading head 7 reads the data on the first magnetic layer 2 before the data become protected from reading in order to confirm a correct operation of the recording head 6. As it has become clear from above explanation, the reading head 7 is not an essential competent consisting the recorder.

Figure 4:
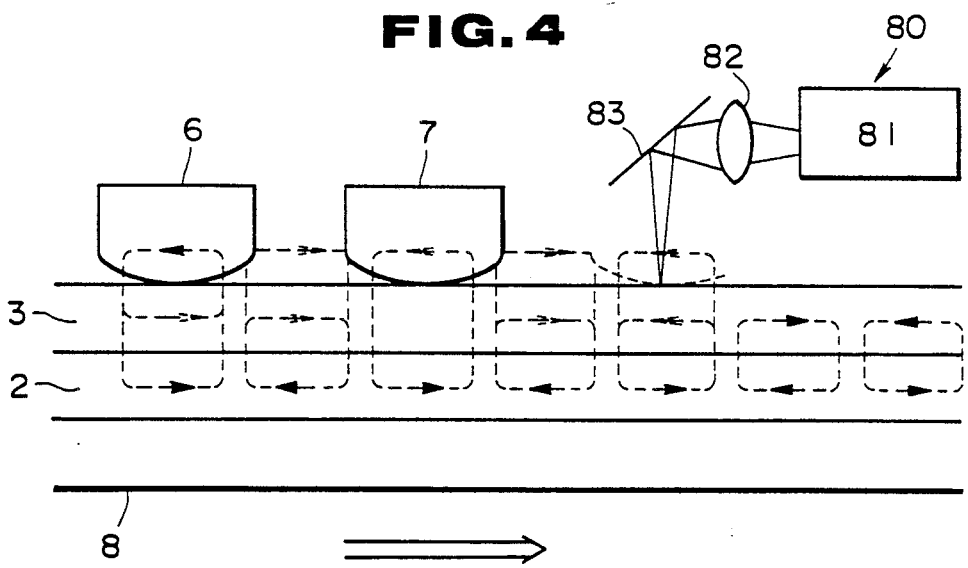
FIG. 4 is a sketch showing schematically a magnetic card recorder according to a modified embodiment of the present invention.

FIG. 4 shows a modified embodiment of the apparatus, wherein a thermal head 8 is replaced by a laser means 80 comprising laser beam generator 81, lens 82 and a reflector 83 co-acting to apply laser beam onto the second magnetic layer 3 for raising a temperature thereof instead of the thermal head. The optical system comprising the lens 82 and the reflector 83 is so constructed as to focus the laser beam on a prescribed spot on the second magnetic layer. The temperature of the second magnetic layer 3 is raised by means of the laser means 80 also effectively.

Figure 5:
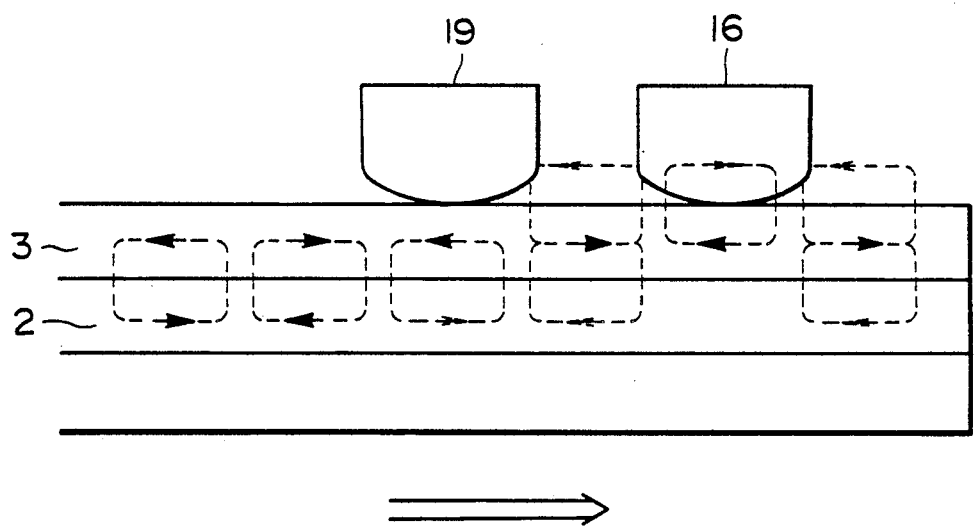
FIG. 5 is a sketch showing schematically a magnetic card reader according to an embodiment of the present invention.

FIG. 5 shows a magnetic card and an embodiment of magnetic card reader. The card proceeds from left to right according to the figure. The magnetic card reader comprises an erasing head 19 for generating a magnetic field for erasing data recorded on the first magnetic layer 2 and a reading head 16 for reading data transferred on the second magnetic layer 3. The magnetic card comes in contact with the erasing head 19 first and magnetization of the first magnetic layer, forming a closed magnetic flux together with the magnetization of the second magnetic layer, is erased by means of a magnetic field generated by the erasing head 19. Intensity of the magnetic field is so adjusted as to erase the magnetization of the first magnetic layer selectively without erasing magnetization of the second magnetic layer. This selective erasure of magnetization is possible because coercive force of the second magnetic material is more than ten times higher than that of the first magnetic material.

Figure 6:
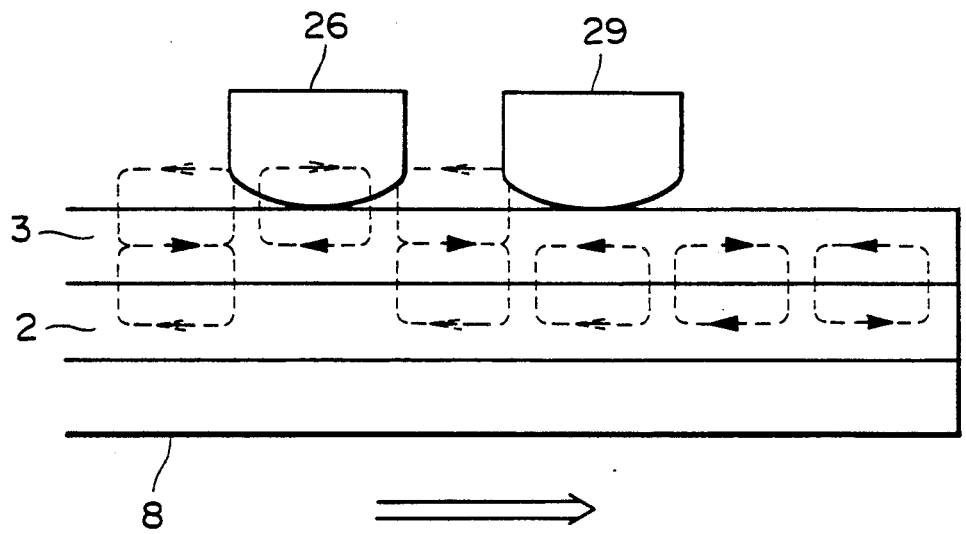
FIG. 6 is a sketch showing schematically a post-processor according to an embodiment of the present invention.

FIG. 6 shows an embodiment of post-processor which performs a data protection on such magnetic cards having a magnetization only at the second magnetic layer 3 as those treated by the above-mentioned recorder. The post-processor comprises a magnetic head 29 for generating an alternating magnetic field.

Here in the figure also, the magnetic card proceeds from left to right. As the card proceeds, the magnetic head 29 applies an alternating magnetic field to the card, and intensity of the magnetic field influencing the magnetic card decreases gradually as the card proceeds farther from the magnetic head 29. By virtue of the alternating magnetic field of decreasing amplitude, a magnetization, opposite in direction to that of the first magnetic layer, is transferred on the first magnetic layer by virtue of a so called alternating magnetic transfer. As a result, a closed magnetic flux is formed between the first and second magnetic layers and it becomes impossible to read the data from outside.

An apparatus for reading the magnetic card may comprise the above-mentioned card reader and post-processor. By virtue of this construction, magnetization of the first magnetic layer 2 is first erased by means of the erasing head 19, next data transferred on the second magnetic layer 3 is read by means of the reading head 16, and a opposite direction magnetization is formed in the first magnetic layer 2 so as to form a closed magnetic flux and make it impossible to read data out of the card. Therefore, the data retained in the card is protected from unauthorized readings before and after an operation of the apparatus. The erasing head 19 in the card reader and the magnetic head 29 in the post-processor may be same magnetic heads. The magnetic head may serve as an erasing head 19 when the head is supplied with a direct electric current and serve as a magnetic head 29 when the head is supplied with an alternating electric current.

Figure 7:
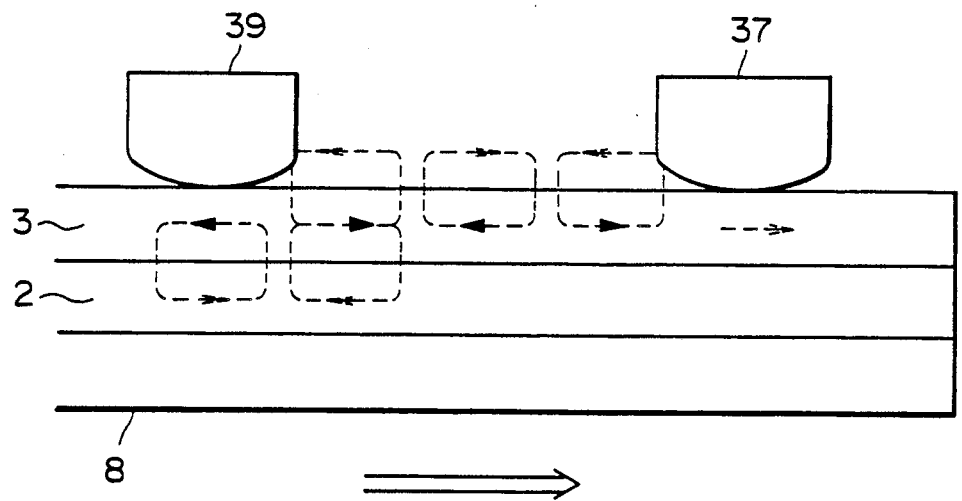
FIG. 7 is a sketch showing schematically a data eraser according to an embodiment of the present invention.

FIG. 7 shows an embodiment of data eraser which comprises an erasing head 39 for erasing data recorded on the first magnetic layer 2 and a thermal head 37 for heating the second magnetic layer and demagnetizing the second magnetic layer. The magnetic card comes in contact first with the erasing head 39 and by virtue of a constant magnetic field generated by the erasing head 39, magnetization of the first magnetic layer is erased. The erasing head is not required to generate magnetic field enough intensive to erase magnetization of the second magnetic layer and an intensity enough to erase the magnetization of the first magnetic layer meets with the requirement. Then, the magnetic card proceeds to the thermal head 37 and the temperature of the second magnetic layer 3 is raised equal to or higher than the Curie temperature of the second magnetic material so that the coercive force thereof drops to substantially zero. Thus, all data on the first and the second magnetic layers are erased. Because data recorded in the first magnetic layer is erased before erasure of the second magnetic layer, nothing remains on the second magnetic layer after the temperature thereof is decreased to an atmospheric temperature.

Figure 8:
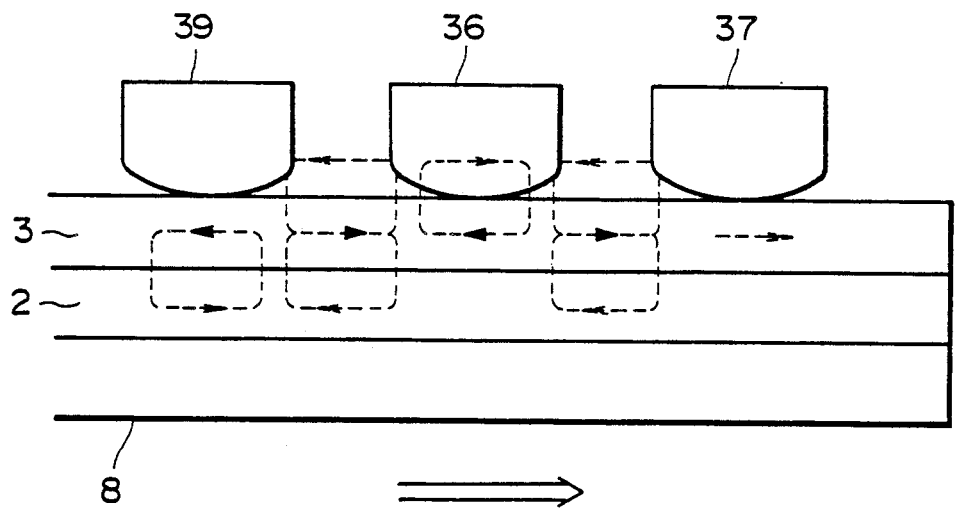
FIG. 8 is a sketch showing schematically an apparatus for reading and erasing data on the magnetic card according to an embodiment of the present invention.

FIG. 8 shows an embodiment of apparatus for reading and erasing data from the magnetic card. As the apparatus comprises an erasing head 39 for erasing magnetization of the first magnetic layer 2, a reading head 36 for reading data from the second magnetic layer 3, and a thermal head 37 for heating the second magnetic layer so as to demagnetize the second magnetic layer, the apparatus performs functions of both the magnetic card reader shown in FIG. 5 and the data eraser shown in FIG. 7. The apparatus reads data stored on a magnetic card and erases data out of it. When a portion of a magnetic card is to be read out without being erased by the apparatus, the card is proceeded in an inverse direction, from right to left according to the figure, while generating an alternating magnetic field by the erasing head 39. By effects of an alternating magnetic field as mentioned above, a opposite direction magnetization is transferred on the first magnetic layer 2 and a closed magnetic flux is formed in the magnetic layers 2, 3. Thus, remaining data are protected against unauthorized readings after reading and erasing data by the apparatus. The apparatus may be employed in an instrument for handling pre-paid cards wherein it is required to read and confirm the data stored on the card, to erase a portion of data to mark an usage, and to reconstitute a protection for the rest of data for consequent usages.

By adding an apparatus for recording and reading data as shown in FIG. 3 or FIG. 4 to the above-mentioned apparatus for reading and erasing data, and eliminating duplicated elements therefrom, an apparatus for reading, recording, and erasing data is obtained. An example is an apparatus wherein an erasing head 39, an reading head 36, a thermal head 37, a recording head 6 and a reading head 7 are comprised and arranged in this order.

By adding an apparatus for data protection as shown in FIG. 6 to the above-mentioned apparatus for reading, erasing and recording data, an apparatus for reading, erasing, recording and protecting data is obtained. An example is an apparatus wherein an erasing head 39, a reading head 36, a thermal head 37, a recording head 6, a recording head 7 and a magnetic head 29 are comprised and arranged in this order.

In the above examples, MnBi alloy is used for the second magnetic material. But the material is not restricted to MnBi alloy and may be replaced by such materials as PtCo alloy having a Curie temperature between 270° C. and 430° and a coercive force around 6000 Oe at an atmospheric temperature, CeCo alloy having a Curie around 370° C. and a coercive force around 200000 Oe, NdFeB alloy having a Curie temperature around 310° C. and a coercive force around 12000 Oe, and MnAl alloy having a Curie temperature around 370° C. and a coercive force around 5000 Oe. The first magnetic material is not restricted to $\gamma$-$Fe_2O_3$ and any material having a higher Curie temperature and a lower coercive force at an atmospheric temperature compared to those of the second magnetic material may be used as the first magnetic material.

As is made clear throughout the above description, a magnetic card which secures a high resolution and reliability in reading and recording data while protecting the data from surreptitious readings is provided by virtue of the present invention. A magnetic card according to the present invention further provides a high resistance of data against magnetic disturbances to which the card may be exposed. Still further, a magnetic card which requires only a non-intensive magnetic field for recording data thereon is provided by the present invention.

Further, there is provided apparatus for reading, recording, erasing and protecting data on the magnetic card which apparatus provides correctness in reading and recording data, and cost efficiency.

What is claimed is:

1. A magnetic card reader for reading data from a magnetic card which includes a card body, a first magnetic layer laid on the card body, the first magnetic layer including a first magnetic material, and a second magnetic layer laid on the first magnetic layer, the second magnetic layer including a second magnetic material having a Curie temperature lower than that of the first magnetic material and a coercive force at room temperature higher than that of the first magnetic material, the magnetic card reader comprising:

(a) magnetic field generating means for generating magnetic field to erase data on the first magnetic layer; and (b) reading means for reading data from the second magnetic layer.

2. A magnetic card reader according to claim 1, wherein the magnetic field generating means erases data on the first magnetic layer by means of direct current erasure.

3. A magnetic card reader according to claim 1 which further comprises transporting means for transporting one of the magnetic card and the magnetic field generating mans and reading means relative to the other whereby data is erased on the first magnetic layer when the magnetic card is proximate the magnetic field generating means and data is read from the second magnetic layer when the magnetic card is proximate the reading means.

4. A post-processor for post-processing a magnetic card which includes a card body, a first magnetic layer laid on the card body, the first magnetic layer including a first magnetic material, and a second magnetic layer laid on the first magnetic layer, the second magnetic layer including a second magnetic material having a Curie temperature lower than that of the first magnetic material and a coercive force at room temperature higher than that of the first magnetic material, the post-processor comprising:

(a) magnetic means for applying an alternating magnetic field of decreasing amplitude to the first magnetic layer to transfer a magnetization o the second magnetic layer to the first magnetic layer.

5. A post-processor according to claim 4 which further comprises transporting means for transporting one of the magnetic card and the magnetic means relative to the other whereby an alternating magnetic field is applied to the first magnetic layer as one of the card and the magnetic means is being transported relative to the other.

6. A data eraser for erasing data stored on a magnetic card which includes a card body, a first magnetic layer laid on the card body, the first magnetic layer including a first magnetic material, and a second magnetic layer laid on the first magnetic layer, the second magnetic layer including a second magnetic material having a Curie temperature lower than that of the first magnetic material and a coercive force at room temperature higher than that of the first magnetic material, the data eraser comprising:

(a) magnetic field generating means for generating magnetic filed to erase data on the first magnetic layer; and (b) heating means for heating the second magnetic layer to a temperature equal to or higher than the Curie temperature of the second magnetic material.

7. A data eraser according to claim 6 which further comprises transporting means for transporting one of the magnetic card and the magnetic field generating means and the heating means relative to the other whereby erasing data on the magnetic card.

8. An apparatus for reading data from magnetic cards, each magnetic card including a card body, a first magnetic layer laid on the card body, the first magnetic layer including a first magnetic material, and a second magnetic layer laid on the first magnetic layer, the second magnetic layer including a second magnetic material having a Curie temperature lower than that of the first magnetic material nd a coercive force at room temperature higher than that of the first magnetic material, the apparatus comprising a magnetic card reader including:

magnetic field generating means for generating magnetic filed to erase data on the first magnetic layer; and reading means for reading data from the second magnetic layer;

and a post processor including magnetic means for applying an alternating magnetic field of decreasing amplitude to the first magnetic layer to transfer a magnetization of the second magnetic layer to the first magnetic layer.

9. An apparatus according to claim 8 which further comprises a data eraser including;

magnetic field generating means for generating magnetic field to erase data on the first magnetic layer; and heating means for heating the second magnetic layer to a temperature equal to or higher than the Curie temperature of the second magnetic material.

10. An apparatus for reading data from the recording data on magnetic cards, each magnetic card including a magnetic card which includes a card body, a first magnetic layer laid on the card body, the first magnetic layer including a first magnetic material, and a second magnetic layer laid on the first magnetic layer, the second magnetic layer including a second magnetic material having a Curie temperature lower than that of the first magnetic material and a coercive force at ambient temperature higher than that of the first magnetic material, the apparatus comprising a magnetic card recorder including:

recording means for recording data on the first magnetic layer; and heating means for heating the second magnetic layer to a temperature equal to or higher than the Curie temperature of the second magnetic material;

a magnetic card reader including:

magnetic field generating means for generating magnetic field to erase data on the first magnetic layer; and reading means for reading data from the second magnetic layer; and a data eraser including;

magnetic field generating means for generating magnetic field to erase data in the first magnetic layer; and heating means for heating the second magnetic layer to a temperature equal to or higher than the Curie temperature of the second magnetic material.

11. An apparatus according to claim 10, which further comprises a post process or including magnetic means for applying an alternating magnetic field of decreasing amplitude to the first magnetic layer to transfer a magnetization of the second magnetic layer to the first magnetic layer.

* * * * *